United States Patent
Bohm et al.

(10) Patent No.: US 6,179,373 B1
(45) Date of Patent: Jan. 30, 2001

(54) SUNSHADE FOR A VEHICLE

(75) Inventors: Horst Bohm, Frankfurt; Thomas Becher, Rodgau; Rainer Grimm, Frankfurt, all of (DE)

(73) Assignee: Meritor Automotive GmbH (DE)

( * ) Notice: Under 35 U.S.C. 154(b), the term of this patent shall be extended for 0 days.

(21) Appl. No.: 09/213,588

(22) Filed: Dec. 17, 1998

(51) Int. Cl.[7] .................................................. B60J 7/00
(52) U.S. Cl. .................. 296/214; 160/273.1; 160/370.22
(58) Field of Search ................................... 296/214, 219, 296/141, 143; 160/266, 265, 268.1, 270–273.1, 370.22

(56) References Cited

U.S. PATENT DOCUMENTS

| | | | |
|---|---|---|---|
| 436,900 | * 9/1890 | Morrison | 160/270 X |
| 1,281,571 | * 10/1918 | Holt | 296/143 X |
| 3,768,540 | * 10/1973 | McSwain | 296/98 X |
| 4,792,178 | 12/1988 | Kokx | 296/98 |

FOREIGN PATENT DOCUMENTS

| | | | |
|---|---|---|---|
| 2411774 | * 9/1975 | (DE) | 160/271 |
| 0644075 | 9/1994 | (EP) . | |
| 4627 | * 1/1983 | (JP) | 296/214 |
| 9601191 | 1/1996 | (WO) . | |

* cited by examiner

Primary Examiner—Dennis H. Pedder
(74) Attorney, Agent, or Firm—Carlson, Gaskey & Olds

(57) ABSTRACT

In a sun blind for a vehicle roof a sun blind is situated below a panel which is displaceably associated with a roof opening, this blind, when not in use, automatically being wound up on a spool (9) which is mounted roof-side. The blind sheet (8) of the sun blind is guided in a sliding manner using its side edges along guide rails (15) attached laterally in the roof opening. The guide rails (15) and the side edges of the blind sheet (8) are formed in such a manner and engage with one another such that the side edges can be slid easily in the guide rails in the course of opening and closing movements of the sun blind, but cannot be pulled out of the guide rails in a transverse direction to the direction of movement of the blind, whereby the edge areas of the blind sheet are secured against fluttering and vibration movements.

11 Claims, 6 Drawing Sheets

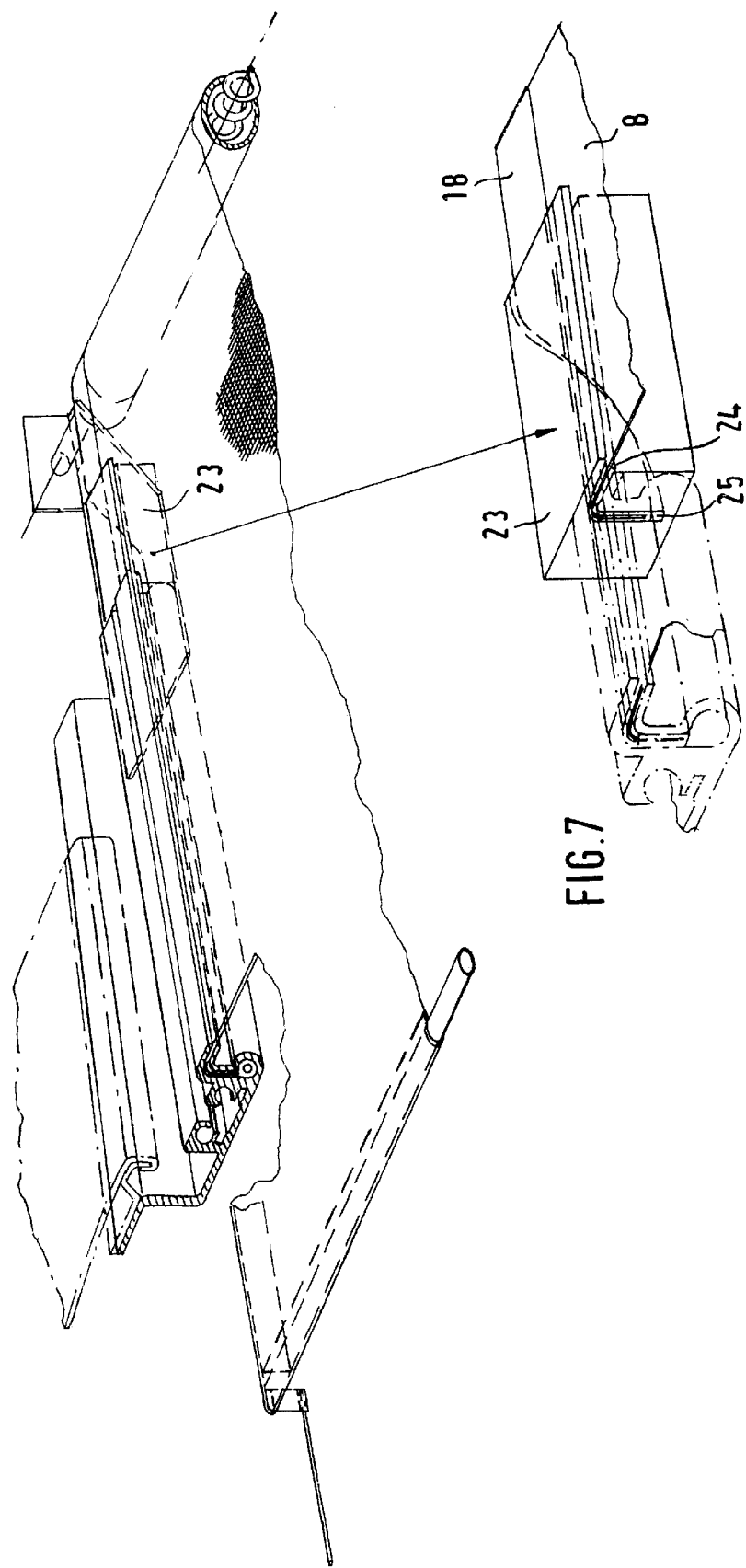

SUNSHADE FOR A VEHICLE

BACKGROUND OF THE INVENTION

The invention concerns a sun blind for a vehicle roof.

Although, in a known sun protector of this kind which can be wound roller blind-style onto a spool (DE 195 38 552 C1), a central strut can be provided in order to prevent the closed sun screen from sagging, no measures are taken to tauten the blind sheet in a transverse direction to its restraint between its front end and its spool. In a similar, known roller blind configuration (DE 44 24 188 C1), the blind sheet, clamped in longitudinal direction, is underpinned by a supporting arch, by means of which the blind sheet is divided into two tautened length areas so that head room in the vehicle interior is not significantly impaired by the blind sheet. Here too, the blind sheet is only tautened in its direction of movement, not in a transverse direction.

In fact sun blinds of this kind are usually tautened only between the front blind edge, usually held on a rod, and the spool, whereby, even with tight tautening of the blind sheet in this direction, the side areas of the blind sheet tend to flutter in the wind, for example in the case of roller blinds which close the roof opening while allowing air through.

A known insect-screening roller blind (DE 196 39 478 A1), non-generic here, for door and window openings on buildings has lateral guides for the insect-screening fabric, these having elastically deformable retention elements made of bristles or brush elements which engage in mesh openings of the lateral edges of the insect-screening fabric. A configuration of this kind cannot be used for vehicle roofs since the retention elements do not adequately protect the roller blind from being pulled out of the lateral guides as a result of the dynamic wind forces exerted on the roller blind during travel and since, moreover, sun blinds do not always have mesh openings.

The task of the invention is to provide a sun blind for vehicle roofs in which the side areas of the roller blind cannot make fluttering movements.

SUMMARY OF THE INVENTION

Through the slidable guidance of the opposing side edges of the blind sheet in the guide rails according to the invention with simultaneous fixing in the transverse direction to the direction of movement of the blind, so that the side edges cannot be pulled out of the guide rails in the transverse direction, the side areas of the blind sheet are very effectively prevented from making fluttering movements. This provides a possibility of fixing the side edges of the blind sheet in a transverse direction in a manner which is equally simple and effective, while still ensuring that the side edges can be slid easily in the guide rails by means of the special formation of the guide grooves in the guide rails for the side edges of the blind sheet. The guide grooves have a guide area which is offset against the level of the blind sheet and in which the side edges of the blind sheet engage with strengthened borders. These strengthened borders can be folded over relative to the main level of the blind sheet, but can be restored to their straight, unfolded position when rolling up the blind sheet so that the blind sheet can be wound onto the spool without folding of the side edges. The folded side edges are held in place by the offset guide areas of the guide grooves in a transverse direction without any of the slide capability of the side edges in the guide grooves being lost.

If the guide rails are spaced in such a manner that the blind sheet is also tautened in a transverse direction, the blind sheet is, to a certain extent, biaxially tautened and drawn and therefore practically resists the wind, when the panel of the vehicle roof is open, without fluttering and vibrating movements.

The guide grooves in the guide rails are advantageously given a cross-section, this being approximately L-shaped, whereby the shorter, horizontal side is approximately at the level of the blind sheet while the longer side, which is directed downwards, forms the guide area for the side edge of the blind sheet. If the offset guide area is positioned approximately perpendicular to the level of the blind sheet, the associated side edge of the blind sheet is folded approximately at right angles inside the guide rail and is thus fixed against lateral extraction in a transverse direction to the direction of movement of the blind.

According to one embodiment, the roller blind is actuated at both sides by traction cables or similar which are accommodated inconspicuously in the guide rails. For this purpose, the guide grooves may have a location channel for the traction cable or similar below the offset guide area.

To avoid rethreading of the side edges of the blind sheet into the guide rails whenever the rolled blind is to be closed, it is advantageous if the front ends of the side edges of the blind sheet remain constantly in the guide rails, i.e. if the side edges retain their offset or folded position in relation to the level of the blind sheet at these front ends.

The bending or folding of the side edges before these are introduced into the guide grooves of the guide rails can be made easier through the use of feed elements. These feed elements receive the side edges of the blind sheet in a flat position at one end and pass these on to the corresponding guide grooves in the guide rails in the folded or offset position at the other end. For this purpose, the feed elements each have a guide channel which is open towards the blind sheet, part of the area of this channel, namely the guide area for the side edges of the blind sheet, being arranged in a spatially rotated manner without transition stages, by means of which the side edges, on passing through the feed element, are steadily and gradually bent or folded into the desired position.

Further details of the invention are explained in more detail using embodiments, sections of which are schematically reproduced in the drawings. These show:

BRIEF DESCRIPTION OF THE DRAWINGS

FIG. 6 is an perspective representation corresponding to FIG. 1 but with additional feed element for the side edge of the blind sheet and FIG. 7 is an perspective representation of the feed element, enlarged in comparison to FIG. 6.

DETAILED DESCRIPTION OF THE PREFERRED EMBODIMENT

Figure 1:
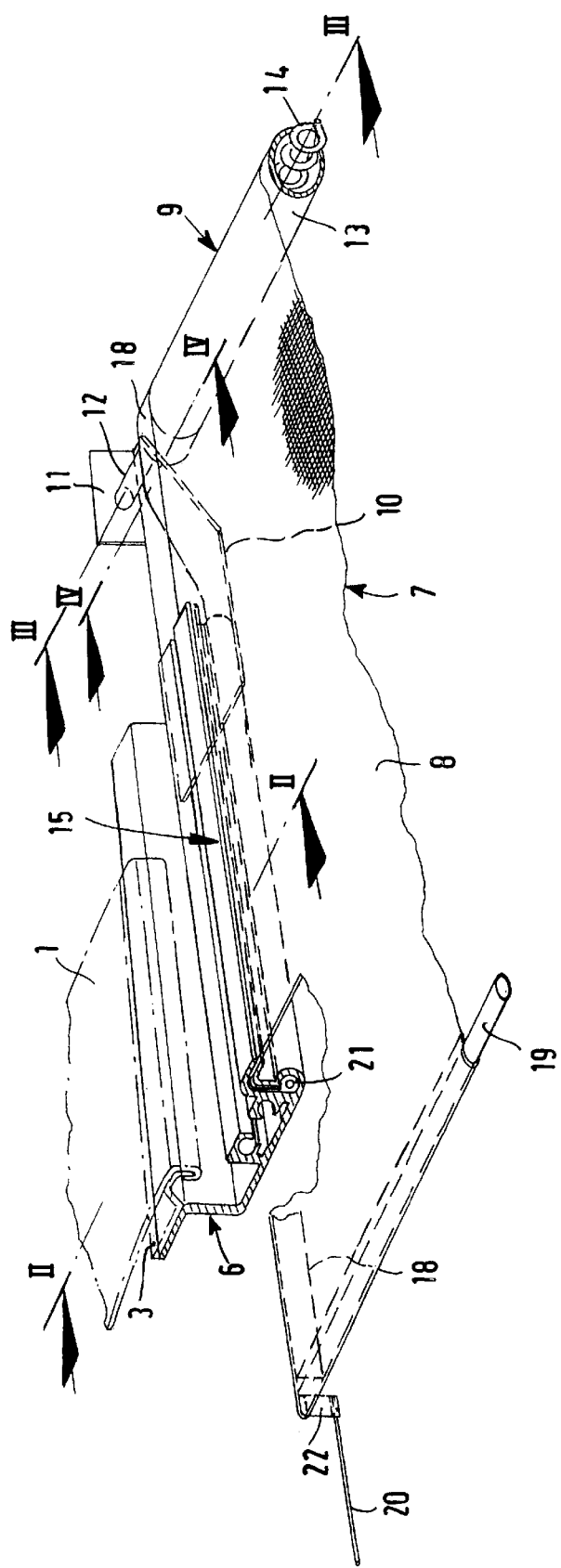
FIG. 1 is an incomplete perspective representation of the sun blind and its positioning on the vehicle roof.
Figure 2:
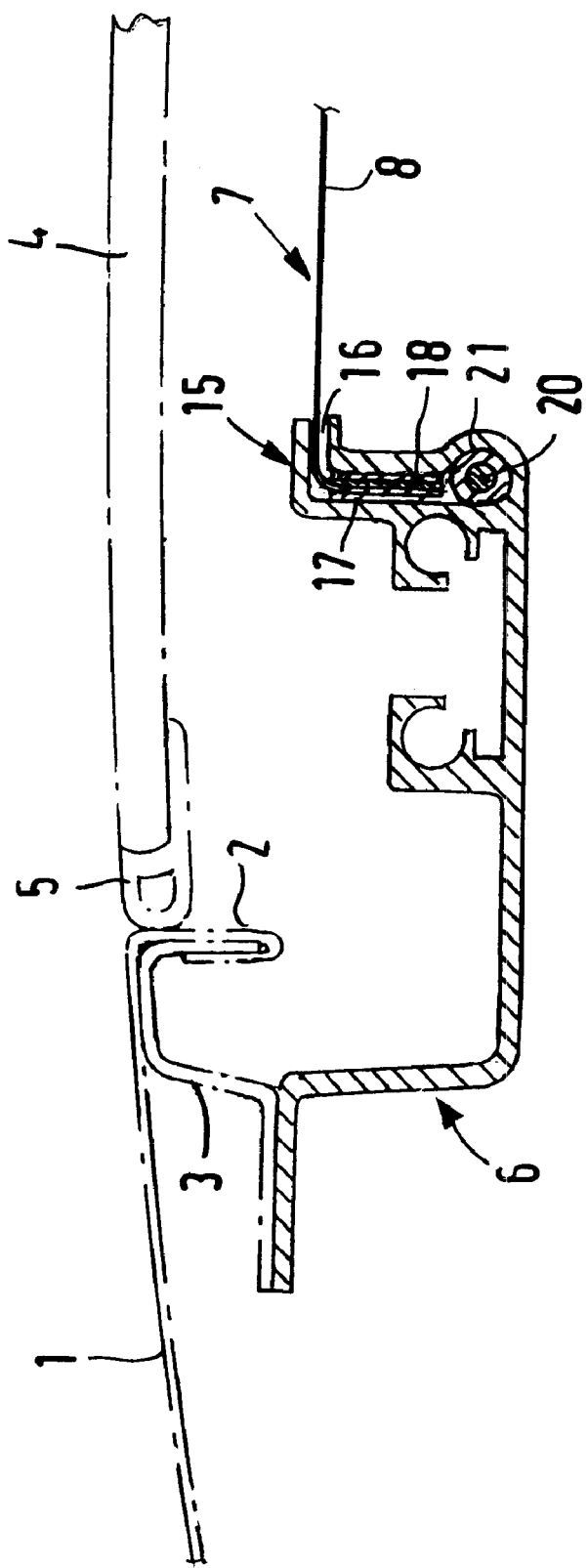
FIG. 2 is an incomplete section along Line II—II of the configuration in FIG. 1.

In FIG. 1 broken lines are used to depict the solid roof surface 1 of a vehicle and the reinforcement frame 3 which surrounds the roof opening 2 made in the solid roof surface 1, and in FIG. 2 broken lines are also used to depict the panel 4 associated with the roof opening 2 and its edge gap-sealing profile 5. In the illustrated example, the panel 4 is a glass panel, but this could also be made of metal. The panel 4 is arranged displaceably in relation to the roof opening 2 in a known manner, and this requires no further explanation here since this arrangement does not belong to this invention.

FIGS. 1 and 2 show only one side of the roof configuration and the sun blind. The opposite side is structured in mirror-image, whereby the two sides in the area of interest of the sun blind here are arranged parallel to one another. A roof frame 6, made, for example, from an extruded aluminium section, is attached to the reinforcement frame 3. The sun blind, indicated in general terms by the reference number 7, is situated below the panel 4, and the blind sheet 8 can be wound onto a spool 9. To ensure that the spool 9 is attached in a rotatable manner, a retaining plate 10 with a bearing block 11, set on edge vertically, is attached to the roof frame 6. A bearing journal 12 of the spool 9 is mounted in a rotatable manner in a bore hole of the bearing block 11. The spool 9 has a hollow, cylindrical winding body 13, which is arranged concentrically to the bearing journal 12 and encloses a restoring spring 14 in the form of a helical screw spring. While the illustrated end of the restoring spring 14 is fixed eccentrically in the spool 9, the other end of the restoring spring 14 (not illustrated) is fixed in a stationary manner outside the spool 9 so that the restoring spring 14 is loaded when the blind sheet 8 is unwound from the spool 9. As soon as the tractive forces acting on the blind sheet 8 as the blind sheet is unwound are removed or become less than the stored spring force, the blind sheet 8 is automatically wound onto the spool 9.

The blind sheet 8 consists, for example, of an air-permeable fabric which can have a greater or lesser degree of light permeability, according to the desired degree of light screening. The two opposing side edges of the blind sheet 8 can be slid along the guide rails 15 in the direction of movement of the blind in a manner which has yet to be described, but are fixed against extraction from the guide rails 15 in the transverse direction to the direction of movement of the blind. The guide rails 15 may be spaced such that the side edges of the blind sheet 8 which are slid along them also tauten the blind sheet in a transverse direction.

In the illustrated example, the guide rails 15 are an integral part of a roof frame 6 and can be formed during the extrusion moulding of the roof frame profile. The guide rails 15 have guide grooves for the side edges of the blind sheet 8. These guide grooves each have an upper through-channel (16) for the blind sheet at the level of the blind sheet (8) onto which the offset guide area (17) for the associated side edge of the blind sheet joins below. As shown in particular in FIG. 2, in the embodiment the guide area 17 which is offset downwards is aligned approximately perpendicular to the level of the blind sheet 8.

Figure 3:
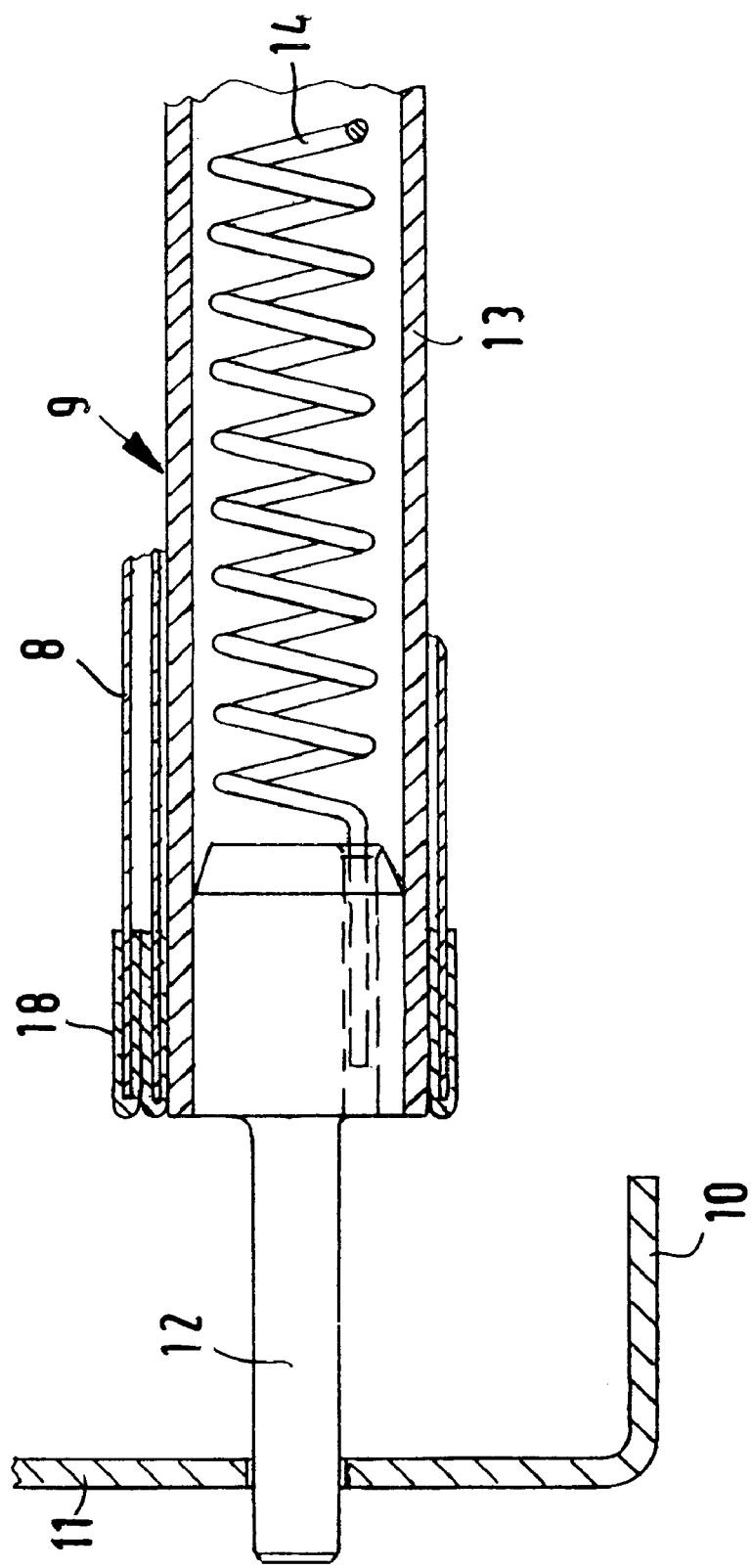
FIG. 3 is an incomplete section along Line III—III in FIG. 1 showing the spool and its roof-side mounting.
Figure 4:
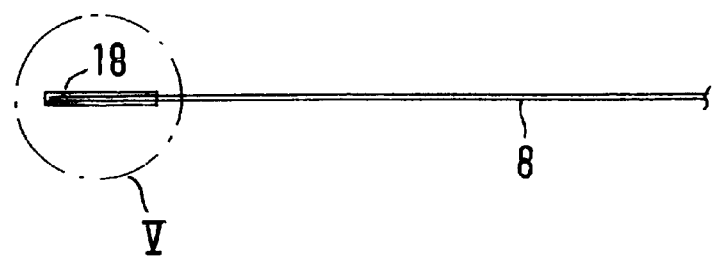
FIG. 4 is an incomplete section through the blind sheet along Line IV—IV in FIG. 1.
Figure 5:
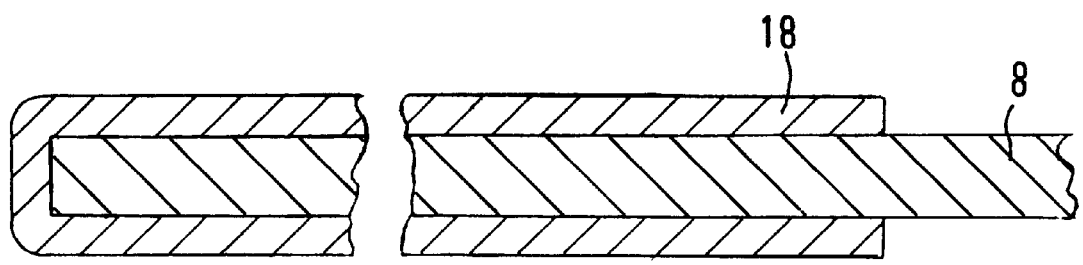
FIG. 5 is an incomplete and enlarged section through the blind sheet according to Circle V in FIG. 4.

For the engagement of the side edges of the blind sheet, the side edges are provided with strengthened borders 18 of a constant width. These strengthened borders can be folded for engagement with the guide areas 17 which are offset against the level of the blind sheet 8, but can be restored to their straight, unfolded position for the rolling of the blind sheet onto the spool 9, as shown in FIG. 3. The strengthened border 18 of the blind sheet 8 can, as shown in FIG. 5 with exaggerated thickness dimensions, be formed as a U-shaped plastic edge which is extruded or laminated on. With the use of a suitable surface material for the blind sheet 8 and/or a suitable plastic, it may also be sufficient if the side edges of the blind sheet are impregnated with plastic. Whatever the case, the strengthened borders 18 must be such that they are readily flexible in the direction of movement of the blind for winding onto and off the spool 9 but fold more easily, seen in the transverse direction, at the transition point between the edge strips and the free blind sheet 8 than within the edge strip in a transverse direction to the direction of movement of the blind.

At the front end of the blind sheet 8, a transverse rod 19 is positioned in the usual manner in a tube formed from the blind sheet material. Through the application of force on the transverse rod 19 in a direction leading away from the spool 9, the blind is unwound from the spool 9, thereby being tautened in the direction of movement of the blind and, at the same time, as a result of the described configuration and structure of the guide rails 15, in a transverse direction as well. The force may be applied manually, whereby latching possibilities (not illustrated) for the transverse rod can be provided to allow intermediate blind positions to be set. It is preferred, however, that a traction cable or similar 20, which acts upon the front end of the blind sheet 8 or the end of the transverse rod 19 is accommodated in each of the guide rails 15 for actuating the blind. The traction cable may, for example, take the form of a Bowden cable, but may also be a threaded cable of the type normally used for the actuation of sliding sunroofs, in which a thread is provided on the cable for engagement with a toothed pinion driven by a crank or an electric motor.

The described guide grooves may have a location channel 21 below the offset guide area 17 for accommodating the traction cable or similar 20, as can be seen in FIGS. 1 and 2. The traction cable 20 is firmly connected to the end of the transverse rod 19 via a catch 22.

The configuration is such that the blind sheet 8 can only be wound onto the spool 9 to such an extent that the front ends of the side edges of the blind sheet, these edges being provided with strengthened borders 18, remain permanently on the guide rails 15 or in the guide grooves of the guide rails 15.

Figure 8:
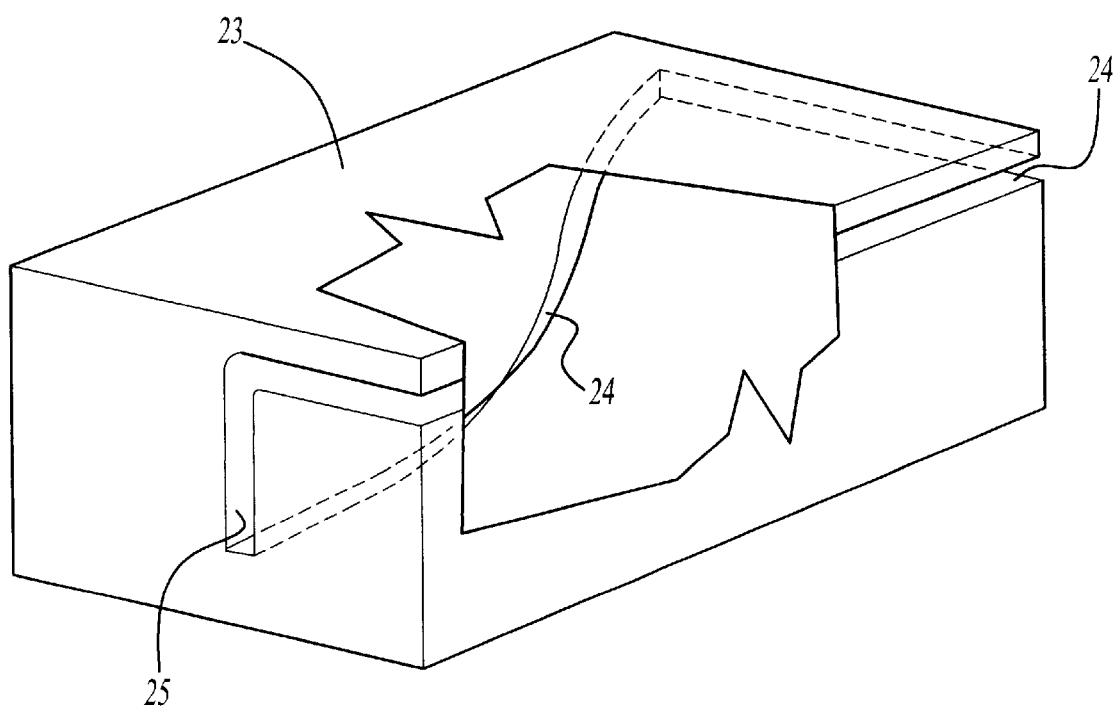
FIG. 8 illustrates a feature of the feed element of FIG. 7.

As can be seen in FIGS. 6, 7 and 8, a feed element 23 can also be attached roof-side at the rear end of the guide rails 15 between the guide rail and the spool 9. It is advisable to attach the feed element 23 to the roof frame 6. The feed element 23 receives the appropriate side edge of the blind sheet 8 which is provided with a strengthened border 18 at the end facing the spool 9 and leads the side edge, in the guide groove of the guide rail, to the end facing the guide rail 15. For this purpose, the feed element 23 has a guide channel 24, which is open towards the blind sheet 8, the channel, with a guide area 25 for the associated side edge, being positioned in a spatially rotated manner in the direction of movement of the blind. The configuration is such that this guide area 25, at the end of the feed element 23 facing the spool 9, is situated approximately at the level of the blind sheet 8, but, at the end of the feed element 23 facing the guide rail 15, is aligned with the corresponding guide area 17 of the guide groove in the adjacent guide rail 15. The spatially rotated guide channel ensures that the side edge of the blind sheet with the strengthened border 18 is guided out of its flat position during the unrolling process, as shown on the right of FIG. 7, into the 90° offset position, as shown on the left of FIG. 7, and that, during the winding process, the spatially rotated guide channel 24 causes the offset, reinforced side strip to be restored to its flat position, from which it can be wound up.

The proposal is for a sun blind for a vehicle roof in which a sun blind is situated below a panel which is displaceably associated with a roof opening, this blind, when not in use, automatically being wound up on a spool which is mounted roof-side. The blind sheet of the sun blind is guided in a sliding manner using its side edges along guide rails attached laterally in the roof opening. The guide rails and the side edges of the blind sheet are formed in such a manner and engage with one another such that the side edges can be slid easily in the guide rails in the course of opening and closing movements of the sun blind, but cannot be pulled out of the guide rails in a transverse direction to the direction of movement of the blind, whereby the edge areas of the blind sheet are secured against fluttering and vibration movements.

What is claimed is:

1. A vehicle roof assembly, comprising:

a roof structure with an opening;

a panel that is selectively moved across the opening;

a blind sheet that is positioned below the panel and selectively wound on a spool that is supported by the roof structure, opposing side edges of the blind sheet being guided in a sliding manner in guide rails in a direction of movement of the blind while being maintained in the guide rails in a second direction that is transverse to the direction of movement, the guide rails having grooves with a guide area that is offset relative to a level of the blind sheet, the blind sheet having strengthened borders at opposing side edges, the borders being selectively folded over for engagement with the guide areas offset relative to the level of the blind sheet and selectively restored to a straight, unfolded position when a corresponding portion of the sheet is received on the spool; and a feed element at one end of each of the guide rails between the guide rails and the spool, each feed element having a guide channel that receives an edge of the blind sheet near a first end of the feed element adjacent the spool and directs the edge of the blind sheet into the guide rail at a second end of the feed element as the sheet moves through the feed element, the guide channel first end being situated approximately at the level of the blind sheet, the guide channel second end being spatially rotated relative to the first end and aligned with the corresponding guide groove in the corresponding guide rail.

2. The assembly of claim 1, including a mutual spacing between the guide rails such that the blind sheet is maintained taut in a direction transverse to the direction of movement of the blind sheet.

3. The assembly of claim 1, wherein each first end of the guide grooves is an upper through-channel for the blind sheet at the level of the blind sheet onto which the offset guide area joins below.

4. The assembly of claim 1, wherein the offset guide area is aligned approximately perpendicular to the level of the blind sheet.

5. The assembly of claim 1, including a cable associated with a front end of the blind sheet, the cable being received within the guide rails.

6. The assembly of claim 5, wherein the guide grooves include a location channel that receives the cable.

7. The assembly of claim 1, wherein a leading portion of the blind sheet is not wound onto the spool and the edges of the blind sheet at the leading portion are permanently maintained within the guide grooves.

8. A vehicle roof shade assembly, comprising:

two guide rail members adapted to be supported near a roof structure;

a spool near one end of the guide rail members;

a blind sheet that is selectively wound on a spool, opposing side edges of the blind sheet being guided in a sliding manner in the guide rails in a first direction while being restrained in the guide rails against movement in a second direction that is transverse to the first direction, the blind sheet having strengthened borders at the side edges, the borders being selectively folded over for movement through the guide rails and selectively restored to a straight, unfolded position when a corresponding portion of the sheet is received on the spool; and a feed element at one end of each of the guide rails between the guide rails and the spool, each feed element having a guide channel that receives an edge of the blind sheet near a first end of the feed element adjacent the spool and directs the edge of the blind sheet into the guide rail at a second end of the feed element, the guide channel first end being situated approximately at a level where the blind sheet is received on the spool, the guide channel second end being spatially rotated relative to the first end and aligned with the corresponding guide rail.

9. The assembly of claim 8, including a mutual spacing between the guide rails such that the blind sheet is maintained taut in the second direction.

10. The assembly of claim 8, wherein each guide rail first end is aligned in a first plane and the second end is aligned in a second plane that is approximately perpendicular to the first plane.

11. The assembly of claim 8, wherein a leading portion of the blind sheet is not wound onto the spool and the edges of the blind sheet at the leading portion are permanently maintained within the guide grooves.

* * * * *